June 10, 1924.
W. SHAW
DIE
Filed July 25, 1922
1,497,409
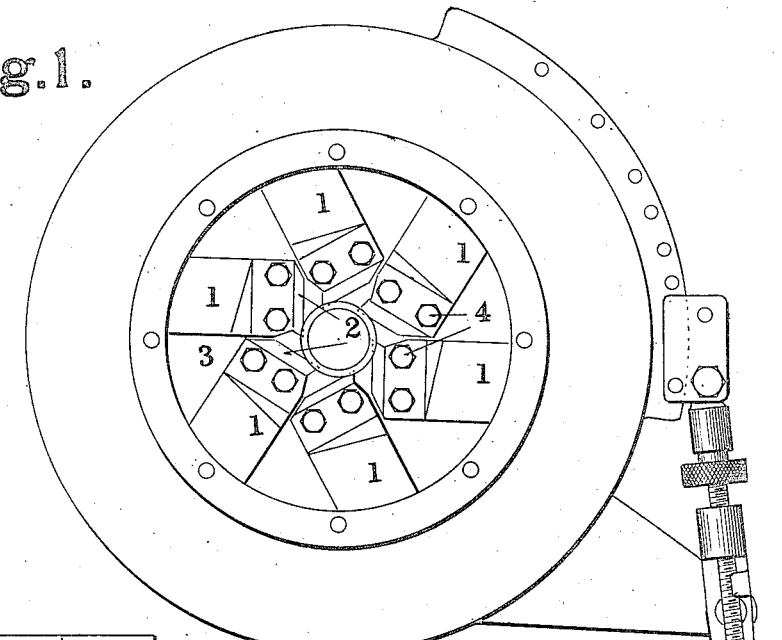
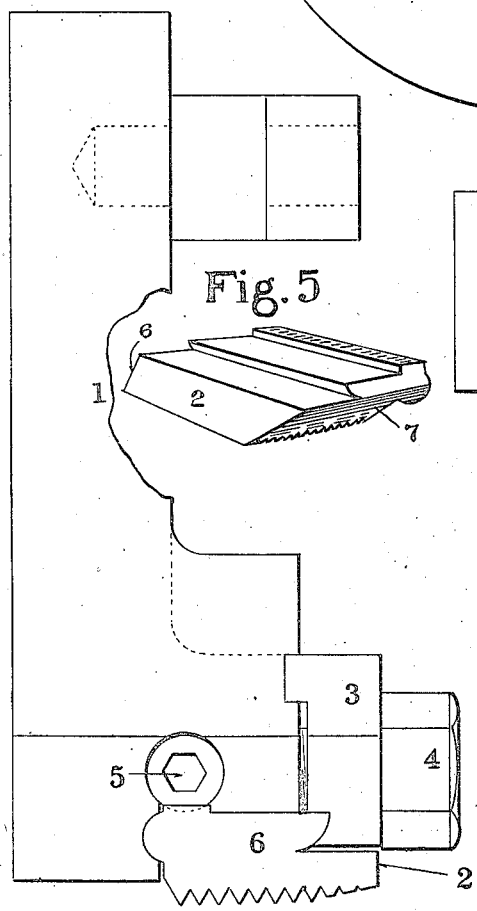
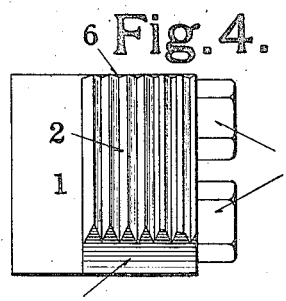
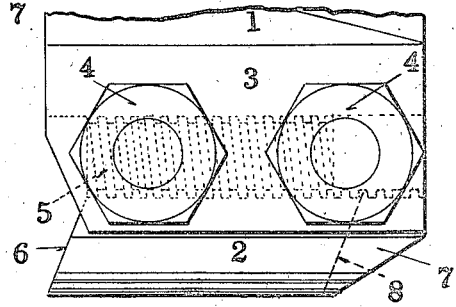
Fig.1. Fig.2. Fig.3. Fig.4. Fig.5.
INVENTOR
William Shaw
BY E. E. Huffman
ATTORNEY Patented June 10, 1924.

1,497,409

UNITED STATES PATENT OFFICE.

WILLIAM SHAW, OF EDWARDSVILLE, ILLINOIS, ASSIGNOR TO N. O. NELSON MANUFACTURING COMPANY, OF ST. LOUIS, MISSOURI, A CORPORATION OF MISSOURI.

DIE.

Application filed July 25, 1922. Serial No. 577,445.

*To all whom it may concern:*

Be it known that I, WILLIAM SHAW, a citizen of the United States of America, residing at the city of Edwardsville, Madison County, State of Illinois, United States of America, have invented a certain new and useful Die, of which the following is such a full, clear, and exact description as will enable any one skilled in the art to which it appertains to make and use the same, reference being had to the accompanying drawings, forming part of this specification.

My invention relates to a threaded cutting die or "chaser" of the type which consists of a substantially rectangular block of steel having parallel grooves and ridges or serrations on one face the ends of which form the cutting elements.

The object of the invention is to provide means whereby substantially all of the length of the cutting face may be used whereas dies heretofore made had to be discarded before the cutting face was worn out on account of the fact that the holding surfaces had become so shortened that the die could no longer be properly held by the clamp. It will be apparent that my invention cheapens the cost of production of a die having the same life as a die of the previous form referred to.

In the accompanying drawings which illustrate my invention, Figure 1 is a front elevation of a die head including the die holding slides of the type in which my improved die is adapted to be used; Figure 2 is an edge view of one of the die holding slides showing an end view of the die and die clamping means; Figure 3 is a front view of the lower portion of the structure shown in Figure 2 and showing a side view of my improved die; Figure 4 is a bottom view of the parts shown in Figure 2; and Figure 5 is a perspective view of my improved die.

The die head is of the type described in my United States Patent No. 1,146,354 in which the slides 1 are moved inwardly and outwardly by means of angular slots in plates rotated by means of the handle. The dies 2 have a laterally projecting portion fitting in a groove in the holder as shown in Figure 2 and are held by clamping members 3 forced to clamping position by bolts 4. The position of the dies with respect to the slides is adjusted by the screw 5 which engages threaded portions on the extension from the top of the die, which extension enters the opening in which the screw is seated. The die is sharpened by grinding the forward face 6 and this grinding of course shortens the holder and clamp engaging surfaces of the die. By providing the die with the rearwardly extending portion 7 to form an elongation of the clamping surface, this clamping surface will remain long enough to make it possible for the clamping means to hold the die properly even though it has been shortened by successive grinding operations substantially back to the dotted line 8, and consequently until substantially all of the thread cutting serrations have been used up.

As shown in the drawings, I prefer to taper the rear face of the die holding extension having the plane of this face positioned to cut the plane of the bottom of the die along a line at right angles to a side of the die. By this arrangement, the dies may be brought closer in a multiple die head and a smaller diameter of pipe threaded without interference of a die with an adjoining die holder as would be the case if the die were of uniform vertical thickness throughout its length. This condition is illustrated in Figure 1.

Having fully described my invention, what I claim as new and desire to secure by Letters Patent of the United States is:

1. The combination with die clamping means of a thread cutting die comprising a block having one face provided with longitudinal thread cutting serrations and having the portion engaged by the clamp longer than said face.

2. A thread cutting die comprising a block having one face provided with cutting ridges and its rear end tapered in a plane cutting the plane of said face along a line substantially at right angles to its length.

In testimony whereof, I have hereunto set my hand and affixed my seal.

WILLIAM SHAW. [L. S.]